United States Patent Office 3,172,870
Patented Mar. 9, 1965

3,172,870
SILICONE SYNTHETIC RUBBER COMPOUND, METHOD OF MAKING AND METHOD OF CURING THE SAME
Frederic W. Bickel, Burbank, Philip J. Reiner, Woodland Hills, and Robert G. Larkin, Los Angeles, Calif., assignors to Douglas Aircraft Company, Inc., Santa Monica, Calif.
No Drawing. Filed June 23, 1959, Ser. No. 822,204
11 Claims. (Cl. 260—37)

This invention relates to a synthetic rubber compound made of a new formulation consisting essentially of a mixture of a fluorinated silicone rubber and a silicone rubber, the method of making such compound, and the method of curing it.

It particularly relates to such a compound which, when cured, is useful for and satisfactorily meets the requirements for a seal such as an O-ring in the packing glands in the flexible portions of tubing or piping in the fuel distribution system of a jet airplane, which flies at such altitudes that the seal is subjected to such low temperatures as $-65°$ F. and is exposed continuously to jet fuel containing paraffin hydrocarbons, aromatic hydrocarbons, naphthenic hydrocarbons and may be exposed externally with accidental leakage from a hydraulic system, to hydraulic fluids containing either petroleum hydrocarbons or phosphate esters and to such diester lubricants as dioctyl sebacate.

In most jet airliners there are several hundred such flexible couplings each requiring two seals. It is therefore, a requirement that the coupling be as light as possible. With such a light coupling, each of the following important requirements must be met by the seal:

(1) The seal must contain no plasticizer or other substance soluble in and leached out by the fuel.

(2) The seal must not disintegrate into small particles which would get into and be carried by the fuel.

(3) The seal must be capable of withstanding the abrasion and attrition resulting from flexing and vibration of the coupling in flight.

(4) The seal must have sufficient lubricity against the metal parts into which it is assembled to avoid distortion and tearing in assembly.

(5) In contact with the fuel the seal must swell just the right amount to bring about the most effective sealing.

(6) It must resist the jet fuel such as the JP-4 and JP-5 kerosene and aircraft gasoline throughout the wide temperature range of $-65°$ F. to $165°$ F.; i.e., it must not shrink, swell too much, dissolve or disintegrate.

(7) There must be no leak at low temperature, such as $-65°$ F. after prolonged service flexing and vibration and drying out, weathering, exposure to hydraulic fluid, which may be principally petroleum hydrocarbons, or phosphate esters, or exposure to diester engine lubricants such as diester sebacate.

(8) Retention of flexibility at low temperatures, such as $-65°$ F. after long immersion in the jet fuel; i.e., must have low brittle point after immersion, and will not shrink upon drying out.

(9) Should be capable of withstanding high temperatures, such as $500°$ F. for a sufficient period of time so as to permit an emergency landing before damage.

(10) Resistance to elastic deformation (automatic return to pre-deformed shape) as indicated by high Shore A hardness, tensile strength, and high modulus at a given elongation.

Prior to this invention so far as we are aware, there was no material available which would make a satisfactory seal for the use indicated above and particularly one which would meet the combination of requirements listed above.

In accordance with this invention, however, the discovery has now been made that a seal suitable for such use, particularly on jet airplanes, and especially one meeting the important requirements indicated above, can be made by mixing a fluorinated silicone rubber with a silicone rubber containing only hydrocarbon radicals to form the gum or elastomeric polymer constituent of the compound. Although it will be understood by those skilled in the synthetic rubber art, that a curing agent or catalyst will be added to this gum mixture and in addition a filler, which may be one or more ingredients, this invention consists essentially of the mixture of the fluorinated silicone polymer with the silicone polymer having only hydrocarbon side-chains.

The following examples will illustrate the invention.

EXAMPLE I 70 parts by weight of Silastic LS-53U fluorinated silicone uncured rubber compound containing 100 parts by weight of polymer, 0.8 part by weight of ferric oxide (Mapico Red) filler to the 100 parts of polymer and 40 parts by weight of fumed silica of fine particle size to the 100 parts of polymer were mixed with 30 parts by weight of a General Electric silicone SE555U, containing as a filler, 38 parts by weight of such fumed silica per 100 parts polymer, to make the essential elastomeric polymer mixture ingredient in accordance with this invention. This mixing is effected on a rubber mill to obtain a homogeneous mixture. It will be understood that the fillers here indicated are preferably present in the respective two polymers, but are not necessary to this aspect of the invention. These fillers could be added to the polymer mixture, if desired.

Into the foregoing additional filler is thoroughly dispersed. This consists of ten (10) parts by weight of Hi-Sil X303 fumed silica of fine particle size on a rubber mill followed by five (5) parts by weight of Celite Super Floss amorphous diatomaceous silica of fine particle size.

Inside 100 parts by weight of this mixture there is thoroughly dispersed 0.8 part by weight of benzoyl peroxide (preferably substantially pure). It will be understood by those in the art benzoyl peroxide catalyst is usually available in the trade mixed with tricresyl phosphate. Since it is not desired to have tricresyl phosphate in the final compound, this is preferably first removed before being used as the catalyst in accordance with this invention.

The General Electric SE-555U silicone rubber compound is composed of a polymethyl phenyl vinyl siloxane (made from 94.8 mol percent dichlorodimethyl silane, 5.0 mol percent dichlorodiphenyl silane, and 0.2 mol percent dichloromethyl vinyl silane) having a molecular weight of approximately 500,000 and containing 40 parts by weight to 100 parts of polymer of fumed silica having a surface area of 250–350 square meters per gram. This compound is heat convertible to an elastic material by incorporation of peroxides such as benzoyl peroxide. The letter "U" in the designation SE-555U merely indicates the absence of curing agent or catalyst.

Hi-Sil X303 is a hydrated silica of high purity and extremely fine ultimate particle size.

Typical chemical and physical properties are:

| | |
|---|---|
| Color | White |
| Bulk density lbs./cu./ft. | 3 |
| Specific gravity | 1.95 |
| Refractive index | 1.445 |
| Average particle size microns | 0.022 |
| Surface area sq. meters/gram | 160 |
| pH in 5% aqueous suspension | 4.5 |
| Loss at 105° C. percent | 4–5 |
| Ignition loss do | 10 |
| $SiO_2$ do | 88 |
| NaCl do | 0.04 |
| $Na_2SO_4$ do | 0.04 |
| Oil absorption (linseed oil) gms | 145–160 |

The Celite filler has the following properties:

| | |
|---|---|
| Loss on ignition | 3.0 |
| $SiO_2$ | 89.4 |
| $Al_2O_3$ | 4.1 |
| $Fe_2O_3$ | 1.5 |
| $TiO_2$ | 0.1 |
| CaO | 0.2 |
| MgO | 0.7 |
| $Na_2O(+K_2O)$ | 0.8 |
| Total | 99.8 |
| Color | White. |
| Fineness | Maximum 0.5% on 325 mesh. |
| Average particle size | 2–4 microns. |
| Free moisture content | Max. 1%. |
| Average absorption (Gardner-Coleman method—lb. of liquid per 100 lbs. of Celite) water | 150. |
| Average absorption—linseed oil | 120. |
| Average bulking value, lb. per. cu. ft.—loose | 9. |
| Average bulking value, lb. per cu. ft.—wet | 27. |
| Specific gravity | 2.30. |

The Silastic LS–53U containing the filler described above cured with 2,4-dichlorobenzoyl peroxide had the following typical properties.

*Typical properties*

[As measured on samples molded 5 minutes at 260° F. and cured 24 hours at 300° F., except specific gravity is measured on press vulcanized samples]

| | |
|---|---|
| Color | Red |
| Specific gravity | 1.4 |
| Hardness, Shore-A scale | 55 |
| Tensile strength, p.s.i. | 1000 |
| Elongation, percent | 170 |
| Compression set, percent, after 22 hrs. at 300 F. | 22 |
| Brittle point, degrees Fahrenheit | −90 |
| Stiffening temperature (temperature at which Young's modulus reaches 10,000 p.s.i.) | −78 |
| Linear shrink, percent | 3 |
| Water absorption, 70 hrs. at 212 F.: | |
| Durometer change | −2 |
| Volume change, percent | +3 |
| Tear strength, lbs./in. | 60 |

This Silastic LS–53U is described in the following publications:

(1) "Silastic Facts," published by Dow-Corning Corporation of Midland, Michigan, Reference No. 9–379, dated May 1957.

(2) "Silicone Rubber (1957)," by F. L. Kilbourne, Jr., et al., published by the Connecticut Hard Rubber Company, New Haven, Connecticut, particularly pages 11 and 12.

The Silastic LS–53U fluorosilicone rubber compound is a polymethyl trifluoropropyl vinyl siloxane (made from 84.8 mol percent dichloromethyl trifluoropropyl silane, 15 mol percent dichlorodimethyl silane and 0.2 mol percent dichloromethyl vinyl silane). The letter "U" in the designation in LS–53U merely indicates that the filled compound does not contain a curing agent or catalyst.

This mixture is sheeted off the mill. By means of a metal die rubber preforms were cut in the shape and size from which a 2 inch I.D., .210 inch thick O-ring could be molded. The preform was placed in a rubber mold cavity and molded for 15 minutes at 250° F. followed by an oven cure of one hour at 300° F., then 1 hour at 350° F., 1 hour at 400° F., and finally, 2 hours at 480° F. Thus, a fully cured O-ring was made and ready for test and use.

This O-ring seal contained no plasticizer or other substance soluble in and leached out by the jet fuel. There was no disintegration into small particles which might carry into and be carried by the fuel during the test described below for abrasion and attrition.

Two (2) O-rings made as indicated above, were tested for withstanding abrasion and attrition resulting from a long period of flexing and vibration of the coupling as in simulated flight. O-rings made in accordance with this example of our invention passed this test, whereas O-rings made of the fluorinated silicone rubber compound alone and of the other silicone rubber compound alone, each failed. In this test the fuel lines were 2 inch by 0.042 aluminum tubing. This tubing was beaded per the minimum specifications of AND 10060 Type A and altered so that one tubing of the coupling assembly had two scratches that were 10% in depth of the wall thickness and extended 2″ axially down the tubing from the bead. The two scratches were displaced from each other by 90°. The other tubing in the assembly had two flats that were ¼ the diameter of the tubing in width in place of the scratches.

The coupling assemblies were mounted so that one tubing was rigidly fixed and the other installed so that it could be flexed ±1° in one plane at a rate of 60 cycles per minute. The test assembly was spring loaded so that internal pressure fluctuation caused the tubing to work axially in the coupling. During the test of the 2″ size the internal pressure was varied from 0–20 p.s.i.g. for five fluctuations then the sixth fluctuation was 125 p.s.i.g. at a rate of 18 fluctuations per minute. The test unit was placed in an insulated environmental compartment capable of holding temperatures of 70° F., −65° F., and 160° F. within a range of ±5° for 8 hours.

Instrumentation was provided to ensure the pressures and temperatures noted above.

The coupling assembly having O-ring seals of this invention was installed in the test unit so that it was initially misaligned by 1° and could be flexed ±1° from this initial alignment at 60 c.p.m. The assembly was then filled with simulated JP–4 jet fuel, more particularly described below and allowed to soak for 24 hours. At this time the flexure cycling and pressure fluctuation was initiated. This procedure was followed at 70° F. for 50,000 cycles, at −65° F. for 50,000 cycles and at 160° F. for 50,000 cycles and this order was repeated to 1,000,000 total flexed cycles, until failure or until the desired number of flexure cycles had been completed. Any metal failure or fuel leakage, however slight, was considered a test failure.

In this test the O-rings made in accordance with the invention and installed in the coupling were flexed for one million cycles without any leakage or appearance of adverse effects. The test was discontinued at this very high figure.

The O-ring seal had sufficient lubricity against the metal parts so that there was no distortion and tearing during assembly.

In contact with the fuel these O-rings had just the right amount of swell to bring about the most effective sealing. This is not true of an O-ring made with the fluorinated silicone rubber alone or with the other silicone rubber alone.

These O-rings resist a simulated JP-4 jet fuel throughout the temperature range of —65° to 160° F. They do not shrink, do not swell too much and do not disintegrate in this test. This simulated JP-4 jet fuel contained the following ingredients:

| | Parts by volume |
|---|---|
| Toluene | 30 |
| Cyclohexane (technical grade) | 60 |
| Iso-octane | 10 |
| Normal butyl disulfide | 1 |

To this base add 0.015 percent by weight of normal butyl mercaptan (equivalent to 0.006 percent by weight of mercaptan sulfur).

Also, there was no leakage after drying out and resubjection to the fuel. This was likewise true with respect to weathering, external exposures to phosphate esters, hydraulic fluids, and petroleum hydrocarbons, and to dioctyl sebacate engine lubricants.

After immersion for 7 days in the simulated jet fuel described above at 160° F. the O-rings of this invention were still flexible at —65° F. The brittle point of —100° F. was not changed. Moreover, there was no shrinkage upon drying out.

The O-rings of this invention were subjected to a temperature of 500° in an oven with forced draught for 48 hours and no change was noted except a slight decrease in tensile strength. These O-rings of this invention have the following properties:

| | Value | Test Method |
|---|---|---|
| Hardness, Durometer "A" or equivalent. | 80±5 | ASTM D676-58T. |
| Tensile Strength, p.s.i., min. | 950 | ASTM D412-51T. |
| Elongation, percent, min. | 90 | ASTM D412-51T. |
| Modulus at 100%, p.s.i., min. | 500 | ASTM D412-51T. |
| Dry Heat Resistance: | | |
| Hardness Change, max. | +10 | ASTM D573-53. Temperature: 400 F±5. Time: 70 hr. |
| Tensile Strength Change, percent max. | —25 | |
| Elongation Change, percent, max. | —25 | |
| Surface Hardening. | None | |
| Compression Set Test: | | ASTM D395-55, Method B. Temperature: 212 F±2. Time: 70 hr. Compressed: 30 percent. |
| Percent of original deflection, max. | 50 | |
| Percent of original thickness, max. | 15 | |

It will be understood that the relative proportions of 70 parts by weight of the fluorinated silicone to 30 parts by weight of the other silicone may be varied somewhat, however, for best results it is preferred that the fluorinated silicone be present within the range of about 65 to 75 parts by weight and the other silicone be present within the range of about 35 to 25 parts by weight. The proportion or amount of the fillers, in accordance with this invention, can also be varied somewhat to change the hardness as will be understood by those skilled in the art. Likewise the proportions of the catalyst can be varied slightly, as will be understood by those skilled in the art.

The foregoing describes our invention in its preferred aspects and illustrates our invention by way of specific examples, but alteration and modification may be made thereof within the scope of the appended claims without departing from the invention herein disclosed.

We claim:

1. The silicone rubber compound consisting of a homogeneous mixture of (1) about 70 parts by weight of a fluorinated silicone rubber compound containing 100 parts by weight of polymer, 0.8 parts by weight of ferric oxide filler to 100 parts of polymer, and 40 parts by weight of fumed silica to 100 parts of polymer and (2) 30 parts by weight of silicone rubber compound having only hydrocarbon side chains containing 38 parts by weight of fumed silica per 100 parts of polymer, and in addition, as a filler, 10 parts by weight of fine particle size fumed silica having an average particle size of 0.022 micron and about 5 parts by weight of amorphous diatomaceous silica of fine particle size having an average particle size of about 2–4 microns, the polymeric constituent of said fluorinated rubber compound being made from 84.8 mol percent methyl trifluoropropyl dichloro silane, 15 mol percent dimethyl dichloro silane and 0.2 mol percent methyl vinyl dichloro silane, and the polymeric constituent of said silicone rubber compound having only hydrocarbon side chains made from 94.8 mol percent dimethyl dichloro silane, 5 mol percent diphenyl dichloro silane, and 0.2 mol percent methyl vinyl dichloro silane.

2. The mixture of silicone polymers consisting essentially of a homogeneous mixture of a fluorinated silicone polymer and a silicone polymer having only hydrocarbon side chains wherein said fluorinated silicone polymer is a terpolymer comprising methyl trifluoropropyl, dimethyl and methyl vinyl constituents, and said silicone polymer having only hydrocarbon side chains is a terpolymer of dimethyl, diphenyl and methyl vinyl constituents.

3. The mixture of silicone polymers consisting essentially of a homogeneous mixture of a fluorinated silicone polymer and a silicone polymer having only hydrocarbon side chains wherein said fluorinated silicone polymer is made from 84.8 mol percent methyl trifluoropropyl dichloro silane, 15 mol percent dimethyl dichloro silane and 0.2 mol percent methyl vinyl dichloro silane and the polymeric constituent of said silicone rubber compound having only hydrocarbon side chains made from 94.8 mol percent dimethyl dichloro silane, 5 mol percent diphenyl dichloro silane, and 0.2 mol percent methyl vinyl dichloro silane.

4. The method of making the silicone rubber compound as defined in claim 1 which comprises mixing said fluorinated silicone polymer with said silicone polymer having only hydrocarbon side chains and incorporating in said mixture said fumed silica filler having an average particle size of 0.022 micron, followed by incorporating in the resulting mixture said amorphous diatomaceous filler.

5. The method of curing the silicone rubber compound as defined in claim 1 which comprises thoroughly mixing therewith about 0.8 part by weight of pure benzoyl peroxide catalyst, press curing for 15 minutes at 250 F.° followed by oven curing for one hour at 300° F., 1 hour at 350° F., 1 hour at 400° F., and finally, 2 hours at 480° F.

6. The cured silicone rubber compound resulting from the method of curing as defined in claim 5.

7. A seal made from the silicone rubber compound as defined in claim 1 compounded and cured by thoroughly mixing therewith about 0.8 part by weight of pure benzoyl peroxide catalyst, press curing for 15 minutes at 250° F. followed by oven curing for one hour at 300° F., one hour at 350° F., one hour at 400° F., and finally, two hours at 480° F.

8. The mixture of silicone polymers as defined in claim 3, wherein said fluorinated silicone polymer is present in an amount of from 65 to 75 parts by weight of said mixture and said silicone polymer is present in an amount of from 35 to 25 parts by weight of said mixture.

9. The silicone rubber compound consisting essentially of a homogeneous mixture of a fluorinated silicone polymer and a silicone polymer having only hydrocarbon side chains wherein said fluorinated silicone polymer is a terpolymer comprising methyl trifluoropropyl, dimethyl and methyl vinyl constituents, and said silicone polymer having only hydrocarbon side chains is a terpolymer of dimethyl, diphenyl and methyl vinyl constituents, said fluorinated silicone polymer being present in an amount of from 65 to 75 parts by weight of said mixture and said silicone polymer being present in an amount of from 35 to 25 parts by weight of said mixture.

10. The silicone rubber compound consisting essentially of a homogeneous mixture of a fluorinated silicone polymer and a silicone polymer having only hydrocarbon side chains wherein said fluorinated silicone polymer is a terpolymer comprising methyl trifluoropropyl, dimethyl and methyl vinyl constituents, and said silicone polymer having only hydrocarbon side chains is a terpolymer of dimethyl, diphenyl and methyl vinyl constituents, said fluorinated silicone polymer being present in an amount of from 65 to 75 parts by weight of said mixture and said silicone polymer being present in an amount of from 35 to 25 parts by weight of said mixture, said mixture containing a filler in an amount sufficient to change the hardness of said silicone rubber compound.

11. The silicone rubber compound as defined in claim 10 wherein said filler is fumed silica.

References Cited in the file of this patent

UNITED STATES PATENTS

| | | |
|---|---|---|
| 2,894,969 | Pierce | July 14, 1959 |
| 2,927,908 | Konkle et al. | Mar. 8, 1960 |

OTHER REFERENCES

McGregor: "Silicones and Their Uses," 1954, page 183, McGraw-Hill Book Co., Inc.

Clark: WADC Technical Report 54-213, Wright Air Development Center, Wright-Patterson Air Force Base, Ohio, July 1954.